United States Patent
Kitamura et al.

(10) Patent No.: US 12,439,558 B2
(45) Date of Patent: Oct. 7, 2025

(54) VAPOR CHAMBER AND ELECTRONIC APPARATUS

(71) Applicant: Lenovo (Singapore) Pte. Ltd., Singapore (SG)

(72) Inventors: Masahiro Kitamura, Kanagawa (JP); Takateru Adachi, Kanagawa (JP); Shusaku Tomizawa, Kanagawa (JP); Hajime Yoshizawa, Kanagawa (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 256 days.

(21) Appl. No.: 18/299,832

(22) Filed: Apr. 13, 2023

(65) Prior Publication Data
US 2023/0403823 A1 Dec. 14, 2023

(30) Foreign Application Priority Data

Jun. 10, 2022 (JP) .................. 2022-094612

(51) Int. Cl.
| | |
|---|---|
| *H05K 7/20* | (2006.01) |
| *G06F 1/20* | (2006.01) |
| *H01L 23/427* | (2006.01) |
| *H01L 23/00* | (2006.01) |
| *H01L 25/065* | (2023.01) |

(52) U.S. Cl.
CPC ......... *H05K 7/20336* (2013.01); *G06F 1/203* (2013.01); *G06F 1/206* (2013.01); *H01L 23/427* (2013.01); *H01L 24/32* (2013.01); *H01L 25/0655* (2013.01); *H01L 2224/32245* (2013.01); *H01L 2924/1432* (2013.01); *H01L 2924/1433* (2013.01); *H05K 7/20136* (2013.01)

(58) Field of Classification Search
CPC ..... H05K 7/20336; G06F 1/203; G06F 1/206; H01L 23/427
See application file for complete search history.

(56) References Cited

U.S. PATENT DOCUMENTS

| | | | | | |
|---|---|---|---|---|---|
| 5,411,077 | A | * | 5/1995 | Tousignant | ........... H01L 23/427 165/46 |
| 6,317,322 | B1 | * | 11/2001 | Ueki | ..................... H01L 23/427 361/698 |
| 6,749,013 | B2 | * | 6/2004 | Ikeda | .................... H01L 23/467 165/185 |

(Continued)

FOREIGN PATENT DOCUMENTS

| | | |
|---|---|---|
| JP | H10-267571 A | 10/1998 |
| JP | 2006-177613 A | 7/2006 |
| JP | 2022-59833 A | 4/2022 |

*Primary Examiner* — Mukundbhai G Patel
(74) *Attorney, Agent, or Firm* — Osha Bergman Watanabe & Burton LLP (57) ABSTRACT

A vapor chamber includes: a first metal plate; a second metal plate having an outer edge portion joined to the first metal plate and forming a sealed space in which working fluid is enclosed, the sealed space being formed between the first metal plate and the second metal plate; and a wick stored inside the sealed space. The first metal plate has a through-hole communicating with the sealed space, and the vapor chamber further includes a metal block inserted into the through-hole and joined to the first metal plate to seal the through-hole, the metal block having an outer surface formed flat on a side opposite to a side facing the sealed space.

6 Claims, 7 Drawing Sheets

(56) References Cited

U.S. PATENT DOCUMENTS

| | | | |
|---|---|---|---|
| 10,354,356 B2* | 7/2019 | Hu | G06F 15/163 |
| 2005/0211419 A1* | 9/2005 | Shih | H01L 23/427 |
| | | | 257/E23.088 |

* cited by examiner

VAPOR CHAMBER AND ELECTRONIC APPARATUS

CROSS REFERENCE TO RELATED APPLICATIONS

This application claims priority to Japanese Patent Application No. 2022-94612 filed Jun. 10, 2022, the contents of which are hereby incorporated herein by reference in their entirety.

BACKGROUND OF THE INVENTION

Field of the Invention

The present invention relates to a vapor chamber and an electronic apparatus including the vapor chamber.

Description of the Related Art

An electronic apparatus such as a laptop PC includes a heat generator such as a CPU (Central Processing Unit) or a GPU (Graphics Processing Unit). Such an electronic apparatus includes a cooling module in a chassis so that heat generated from the heat generator is absorbed and dissipated to outside. Japanese Unexamined Patent Application Publication No. 2022-059833 discloses a configuration in which a vapor chamber is connected to a CPU or the like.

SUMMARY OF THE INVENTION

Since the vapor chamber has a large outer shape, it is difficult to form the outer shape to be flat. Because of this, even if the vapor chamber is placed to make direct contact with the CPU or the like, the vapor chamber cannot make close contact with the CPU or the like, so that its heat transfer efficiency decreases.

In view of this, in the configuration of Japanese Unexamined Patent Application Publication No. 2022-059833, a heat receiving plate made of a copper block or the like is sandwiched between the outer surface of the vapor chamber and the heat generator such as the CPU to enhance the adhesion property between the vapor chamber and the heat generator, thereby improving the heat transfer efficiency.

However, it is necessary that a TIM (Thermal Interface Material) such as thermal conductive grease be provided between the heat receiving plate and each of the heat generator and the vapor chamber. That is, in the configuration using the heat receiving plate, a heat transmission portion where the TIM is disposed is provided in two places in total, that is, between the heat generator and the heat receiving plate and between the heat receiving plate and the vapor chamber, and therefore, thermal resistance between the heat generator and the vapor chamber increases. As a result, in this configuration, the improvement effect in the heat transfer efficiency between the vapor chamber and the heat generator is restrictive, and further improvement in the cooling efficiency on the heat generator is desired.

The present invention is accomplished in consideration of the above technical problem, and an object of the present invention is to provide a vapor chamber that can improve cooling efficiency and an electronic apparatus including the vapor chamber.

A vapor chamber according to a first aspect of the present invention includes: a first metal plate; a second metal plate having an outer edge portion joined to the first metal plate and forming a sealed space in which working fluid is enclosed, the sealed space being formed between the first metal plate and the second metal plate; and a wick stored inside the sealed space. The first metal plate has a through-hole communicating with the sealed space, and the vapor chamber further includes a metal block inserted into the through-hole and joined to the first metal plate to seal the through-hole, the metal block having an outer surface formed flat on a side opposite to a side facing the sealed space.

An electronic apparatus according to a second aspect of the present invention includes: a chassis; a heat generator provided inside the chassis; a vapor chamber provided inside the chassis and configured to absorb heat generated from the heat generator. The vapor chamber includes: a first metal plate having a through-hole; a second metal plate having an outer edge portion joined to the first metal plate and forming a sealed space in which working fluid is enclosed, the sealed space being formed between the first metal plate and the second metal plate; a wick stored inside the sealed space; and a metal block inserted into the through-hole and joined to the first metal plate to seal the through-hole, the metal block having an outer surface formed flat on a side opposite to a side facing the sealed space. The metal block has an outer surface connected to the heat generator.

With the aforementioned aspects of the present invention, it is possible to improve cooling efficiency.

DETAILED DESCRIPTION OF THE INVENTION

The following will describe details of a preferred embodiment of a vapor chamber and an electronic apparatus according to the present invention with reference to the attached drawings.

Figure 1:
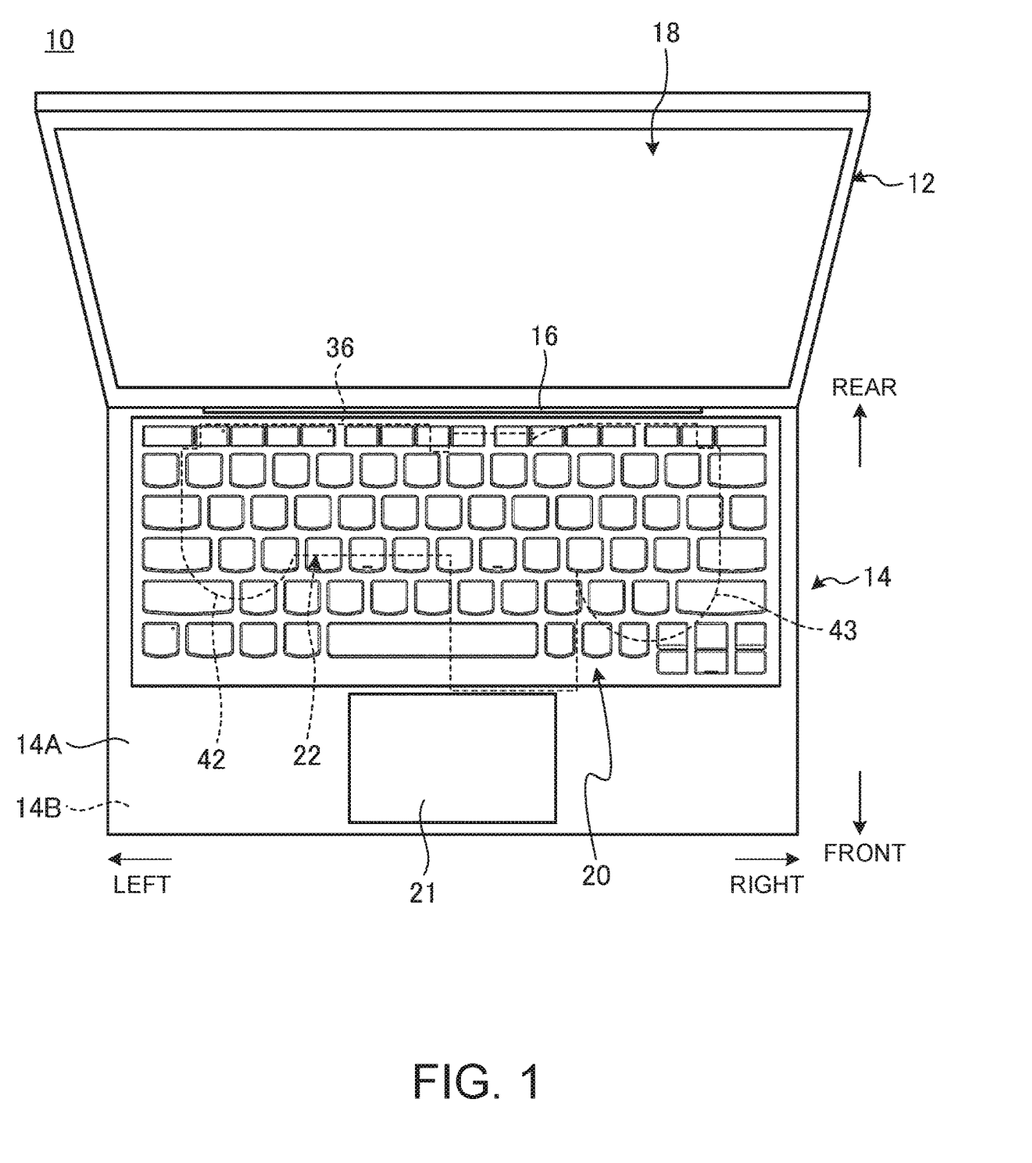
FIG. 1 is a schematic plan view of an electronic apparatus according to one embodiment when the electronic apparatus is overlooked from its top side.

FIG. 1 is a schematic plan view of an electronic apparatus 10 according to one embodiment when the electronic apparatus 10 is overlooked from its top side. As illustrated in FIG. 1, the electronic apparatus 10 is a clamshell laptop PC in which a display chassis 12 is relatively pivotably connected to a chassis 14 with a hinge 16. The electronic apparatus according to the present invention may be also a desktop PC, a tablet PC, a smartphone, a gaming machine, or the like, for example, other than the laptop PC.

The display chassis 12 is a thin flat box-shaped body. A display 18 is mounted on the display chassis 12. The display 18 is constituted by an organic EL (OLED: Organic Light Emitting Diode) or liquid crystals, for example.

The following describes the chassis 14 and each element mounted on the chassis 14 with a near side being referred to as a front side, a deep side being referred to as a rear side, a width direction being referred to as a right-left direction, and a height direction (the thickness direction of the chassis 14) being referred to as an top-bottom direction based on the posture where the display 18 is observable in a state where the chasses 12, 14 are opened as illustrated in FIG. 1.

The chassis 14 is a thin flat box-shaped body. The chassis 14 is constituted by a cover member 14A forming a top surface and four side surfaces, and a cover member 14B forming a bottom surface. The cover member 14A on the top side has a generally bathtub shape having an opening on its bottom surface. The cover member 14B on the bottom side has a generally flat plate shape and serves as a cover closing the opening on the bottom surface of the cover member 14A. The cover members 14A, 14B are put on top of each other in the thickness direction and are detachably connected to each other. On the top surface of the chassis 14, a keyboard 20 and a touch pad 21 are provided. A rear end portion of the chassis 14 is connected to the display chassis 12 by use of the hinge 16.

Figure 2:
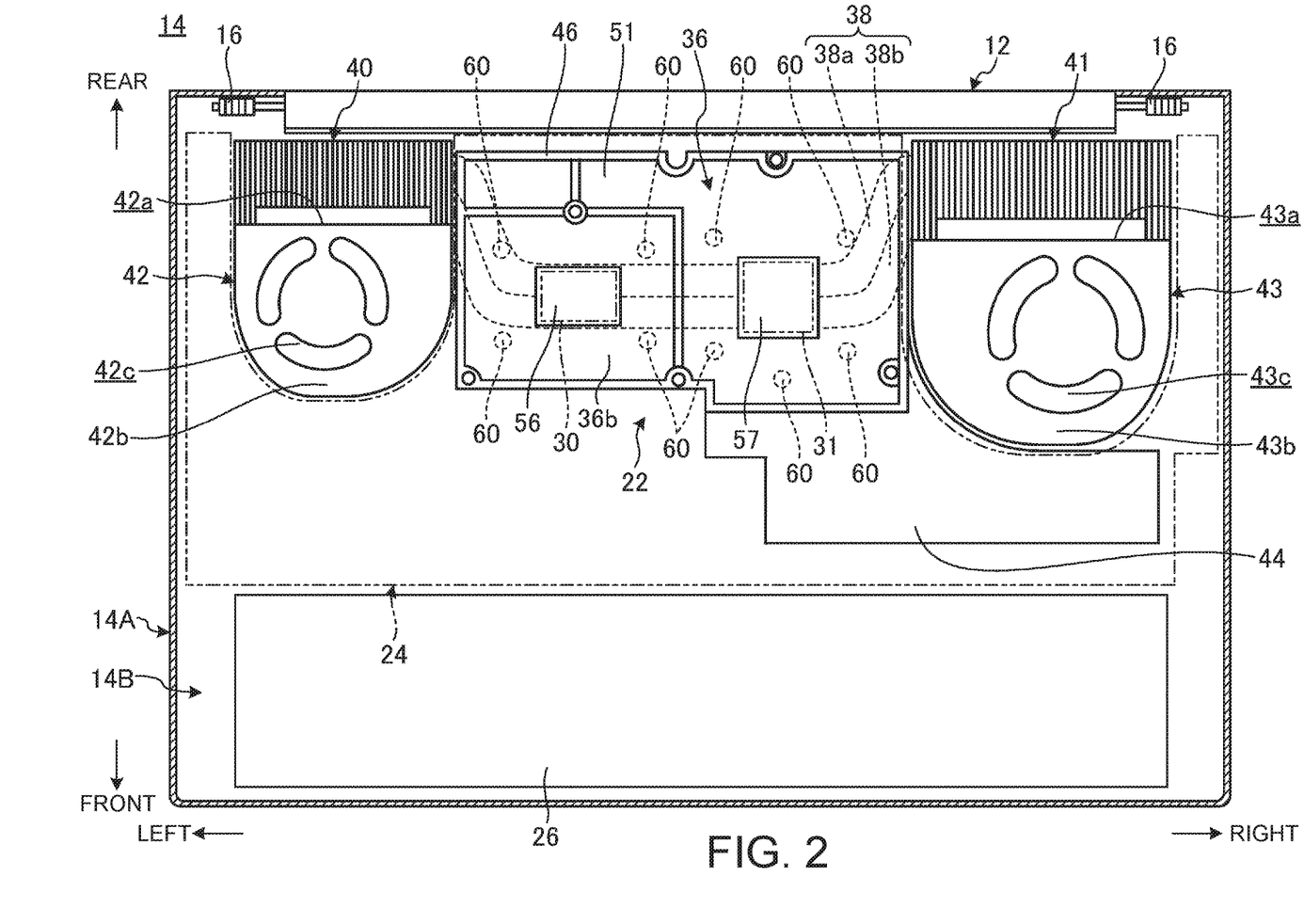
FIG. 2 is a plan view schematically illustrating an internal structure of a chassis.

FIG. 2 is a plan view schematically illustrating an internal structure of the chassis 14 and is a schematic plan sectional view of the chassis 14 cut at a position slightly below the keyboard 20.

As illustrated in FIG. 2, a cooling module 22, a mother board 24, and a battery device 26 are provided inside the chassis 14. Further, various electronic components, machine components, and so on are provided inside the chassis 14.

The mother board 24 is a main board of the electronic apparatus 10. The mother board 24 is placed on a side closer to the rear side of the chassis 14 and extends along the right-left direction. The mother board 24 is a printed circuit board on which various electronic components such as a power component, a communications module, a memory, and a connection terminal are mounted in addition to a CPU 30 and a GPU 31. The mother board 24 is placed under the keyboard 20 and is screwed on the back surface of the keyboard 20 or the inner surface of the cover member 14A. The top surface of the mother board 24 serves as an attachment surface to the cover member 14A, and the bottom surface of the mother board 24 serves as a mounting surface 24a for the CPU 30 and so on (see FIG. 3).

The CPU 30 is placed on a side closer to the left side from the center, in the right-left direction, of the mounting surface 24a of the mother board 24. The CPU 30 performs computing on a main control or a process of the electronic apparatus 10. The GPU 31 is placed next to the right side of the CPU 30 on the mounting surface 24a. The GPU 31 performs computing necessary for image description such as 3D-Graphics.

The battery device 26 is a secondary battery serving as a power supply for the electronic apparatus 10. The battery device 26 is placed in front of the mother board 24 and extends in the right-left direction along a front end portion of the chassis 14.

Next will be described a configuration of the cooling module 22.

The CPU 30 and the GPU 31 are heat generators with largest heat generation amounts among the electronic components mounted inside the chassis 14. In view of this, the cooling module 22 absorbs and diffuses heat generated from the CPU 30 and the GPU 31 and further dissipates the heat to outside the chassis 14. The cooling module 22 is stacked to cover part of the mounting surface 24a of the mother board 24, for example.

As illustrated in FIG. 2, the cooling module 22 includes a vapor chamber 36, a heat pipe 38, a pair of right and left heat sinks 41, 40, a pair of right and left fans 43, 42, and a heat conducting plate 44.

The heat pipe 38 is a pipe-shaped heat transport device. The heat pipe 38 is connected to a bottom surface 36a of the vapor chamber 36 at positions overlapping with the CPU 30 and the GPU 31 in the top-bottom direction. The present embodiment deals with a configuration in which two heat pipes 38a, 38b are provided as one set in parallel to each other in the front-rear direction, and the opposite end portions of the heat pipes 38a, 38b are connected to the right and left heat sinks 41, 40. One heat pipe 38 may be used, or three or more heat pipes 38 may be used. Two sets of a pair of heat pipes 38 may be provided, for example, such that one of the two sets is connected to the heat sink 40 and the other of the two sets is connected to the heat sink 41. The heat pipes 38a, 38b are formed by thinly flattening metal pipes into a shape with an oval section and have such a configuration that working fluid is enclosed in respective sealed spaces formed inside the metal pipes. The heat pipes 38a, 38b may have the same as or similar to the structure of a general heat pipe.

The heat sink 40 on the left side has a structure in which a plurality of plate-shaped fins is arranged in the right-left direction at regular intervals. The fins rise in the top-bottom direction and extends in the front-rear direction. A gap through which air sent from the fan 42 passes is formed between the fins adjacent to each other. The heat sink 40 is made of metal having a high thermal conductivity, e.g., aluminum or copper. The heat sink 41 on the right side has a size or the like slightly different from that of the heat sink 40 on the left side, but its basic configuration is symmetric to the heat sink 40 on the left side. On this account, detailed descriptions on the heat sink 41 on the right side are omitted.

The fan 42 on the left side is placed just before the heat sink 40, and a gas discharge port 42a faces the heat sink 40. The fan 42 is a centrifugal fan configured such that an impeller stored inside a fan chassis 42b is rotated by a motor. The fan 42 discharges air inside the chassis 14 from the gas discharge port 42a, the air being sucked in the chassis 14 from respective intake ports 42c opened on the top and bottom surfaces of the fan chassis 42b. The air-blow from the gas discharge port 42a passes through the heat sink 40 and promotes heat dissipation.

The fan 43 on the right side has a size or the like slightly different from that of the fan 42 on the left side, but its basic configuration is symmetric to the fan 42 on the left side. On this account, detailed descriptions on the fan 43 on the right side are omitted. That is, the fan 43 also includes a discharge port 43a facing the heat sink 41, and intake ports 43c opened on the top and bottom surfaces of the fan chassis 43b.

The heat conducting plate 44 is connected to a front edge portion of the vapor chamber 36 and projects forward. The heat conducting plate 44 is a thin plate made of a material having a high thermal conductivity, e.g., metal such as aluminum or copper, graphite, or the like. The heat conducting plate 44 is provided to cover a power component mounted on the mother board 24, for example.

Next will be described a configuration of the vapor chamber 36.

Figure 3:
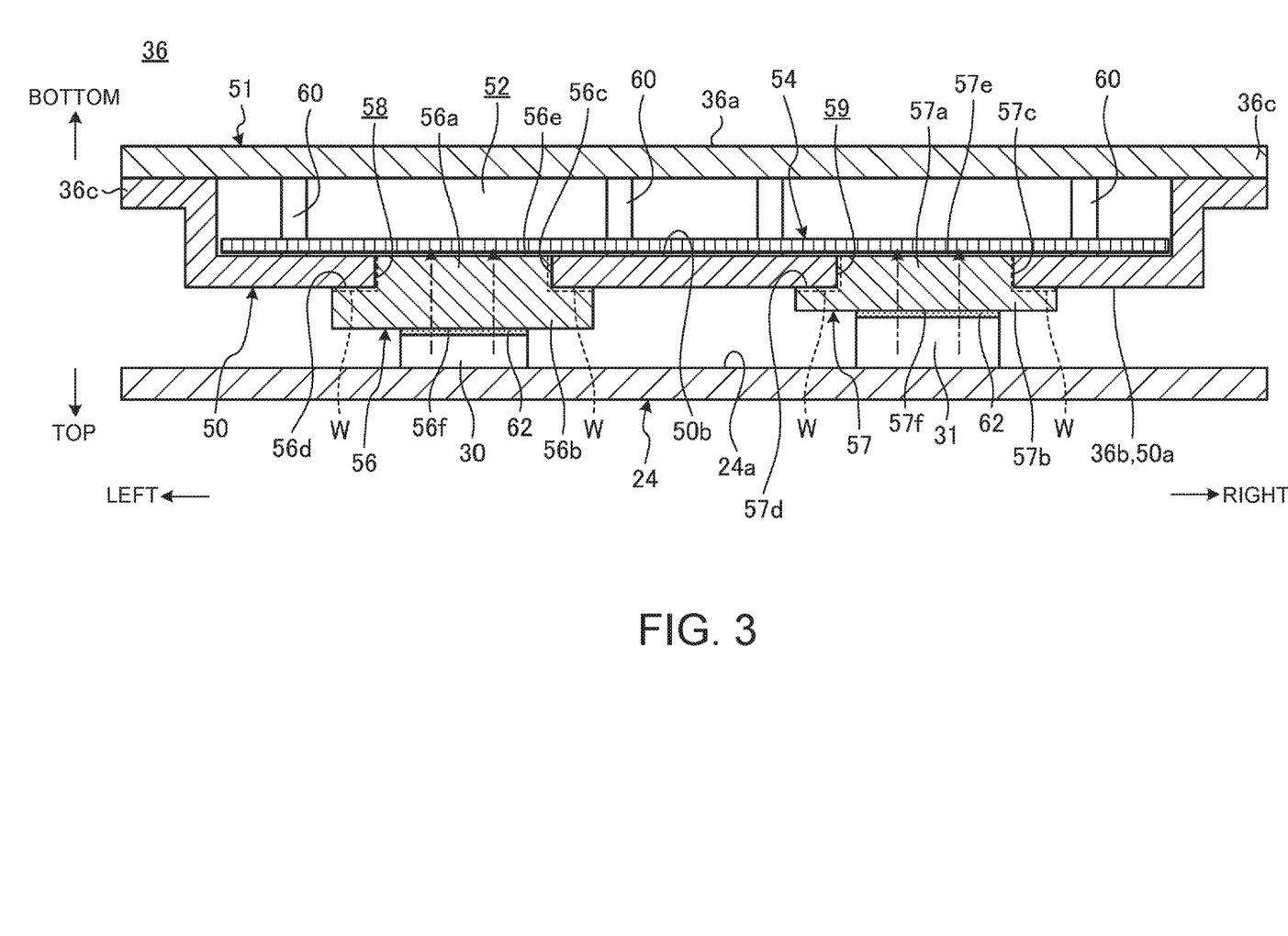
FIG. 3 is a schematic side sectional view of a vapor chamber.

FIG. 3 is a schematic side sectional view of the vapor chamber 36 and illustrates a state where the vapor chamber 36 is connected to the CPU 30 and the GPU 31 mounted on the mother board 24.

As illustrated in FIGS. 2 and 3, the vapor chamber 36 is a plate-shaped heat transport device. The vapor chamber 36 is connected to the CPU 30 and the GPU 31 and absorbs and diffuses heat from the CPU 30 and the GPU 31, and the vapor chamber 36 can also transfer the heat to the heat pipe 38 connected to the bottom surface 36a of the vapor chamber 36. The vapor chamber 36 of the present embodiment is placed between the right and left fans 43, 42 and covers the CPU 30 and the GPU 31. Since the vapor chamber 36 is thin and easily deformable, a frame 46 made of metal is joined to an outer peripheral edge portion and a central portion of a top surface 36b of the vapor chamber 36 to reinforce the vapor chamber 36, for example (see FIG. 2). The frame 46 may be omitted.

The vapor chamber 36 includes a first metal plate 50, a second metal plate 51, a sealed space 52, a wick 54, a first metal block 56, and a second metal block 57.

The metal plates 50, 51 are thin plates made of metal having a high thermal conductivity, e.g., copper, aluminum, or stainless steel. A copper plate is used for the metal plates 50, 51 of the present embodiment. The vapor chamber 36 is configured such that outer edge portions of the metal plates 50, 51 are joined and sealed to form the sealed space 52 in which working fluid is enclosed. The outer edge portions of the metal plates 50, 51 are welded to each other, for example, to form an auricular sealing portion 36c.

The present embodiment deals with a configuration in which the top surface 36b of the vapor chamber 36, that is, an outer surface 50a of the first metal plate 50 serves as a connection surface to the CPU 30 and the GPU 31. A pair of through-holes 58, 59 penetrating from the outer surface 50a to the sealed space 52 is formed in the first metal plate 50. The through-holes 58, 59 serve as embedding holes in which the metal blocks 56, 57 are embedded and are hole portions having a generally rectangular shape in a plan view, for example.

The sealed space 52 serves as a flow path through which the working fluid flows while the working fluid changes in phase. The working fluid can be, for example, water, a chlorofluorocarbon alternative, acetone, butane, or the like. The wick 54 is stored inside the sealed space 52. The wick 54 is configured to forward the condensed working fluid by a capillary phenomenon and is made of a porous body such as a mesh or a fine flow path obtained by knitting a metal thin wire into a cotton form, for example. In the present embodiment, the wick 54 is put on an inner surface 50b of the first metal plate 50 inside the sealed space 52 and makes contact with the inner surface 50b and the metal blocks 56, 57. Thus, it is preferable that the wick 54 be placed at a position closer to the first metal plate 50 to which the metal blocks 56, 57 are attached, than the second metal plate 51 inside the sealed space 52.

In the vapor chamber 36, supports 60 are placed in several places inside the sealed space 52. The support 60 is a reinforcing member that restrains the sealed space 52 from collapsing or deforming. The support 60 rises from the inner surface 50b of the first metal plate 50 such that a distal end of the support 60 abuts with the second metal plate 51. The support 60 may be formed on the second metal plate 51. Hole portions through which the supports 60 are passed are formed in the wick 54 appropriately. The supports 60 should be placed at respective positions where the supports 60 avoid the metal blocks 56, 57 inside the sealed space 52 (see FIGS. 2 and 3).

The metal blocks 56, 57 are thin block-shaped or plate-shaped members made of metal having a high thermal conductivity, e.g., copper, aluminum, or stainless steel. The metal blocks 56, 57 are members that actually make contact with top surfaces of dies of the CPU 30 and the GPU 31 when the vapor chamber 36 is connected to the CPU 30 and the GPU 31.

The electronic apparatus 10 may not include the GPU 31 depending on its specification. In this case, the vapor chamber 36 may include only the first metal block 56 without the second metal block 57. Further, in a case where the vapor chamber 36 is connected to three or more connection targets, still another metal block may be provided in addition to the metal blocks 56, 57.

The first metal block 56 includes a rectangular plate-shaped base portion 56a, and a rectangular plate-shaped flange portion 56b having an outer shape larger than the base portion 56a, and hereby, the first metal block 56 is formed in a stepped mountain shape as a whole. The base portion 56a is inserted into the through-hole 58 such that an outer peripheral surface 56c of the base portion 56a is joined to an inner peripheral surface of the through-hole 58. The flange portion 56b is placed outside the sealed space 52 and the through-hole 58, and a surface 56d, on the base portion 56a side, of the flange portion 56b is joined to the outer surface 50a of the first metal plate 50. A reference number W indicated by a broken line in FIG. 3 is a welded portion via which the outer peripheral surface 56c and the surface 56d are joined to the first metal plate 50.

The second metal block 57 has a shape or a size slightly different from that of the first metal block 56, but its basic configuration may be the same as or similar to that of the first metal block 56. That is, the second metal block 57 also includes a rectangular plate-shaped base portion 57a, and a rectangular plate-shaped flange portion 57b having an outer shape larger than the base portion 57a. The base portion 57a of the second metal block 57 is inserted into the through-hole 59 such that an outer peripheral surface 57c of the base portion 57a is joined to an inner peripheral surface of the through-hole 59 via a welded portion W. The flange portion 57b is placed outside the sealed space 52 and the through-hole 59, and a surface 57d, on the base portion 57a side, of the flange portion 57b is joined to the outer surface 50a via the welded portion W.

The metal blocks 56, 57 are formed such that outer surfaces 56f, 57f opposite to inner surfaces 56e, 57e facing the sealed space 52 are formed flat with a high flatness. The flatness of the outer surfaces 56f, 57f may be set to around ±0.05 mm, for example. The flatness is set to such an extent that the metal blocks 56, 57 can make close contact with the top surfaces of the dies of the CPU 30 and the GPU 31 without causing a large gap or inclination at the time when the metal blocks 56, 57 are brought into contact with the top surfaces of the dies of the CPU 30 and the GPU 31, for example. A reference sign 62 in FIG. 3 indicates a TIM made of thermally-conductive grease or liquid metal and is a member configured to raise the adhesion property between the outer surfaces 56f, 57f and the top surfaces of the CPU 30 and the GPU 31.

Here, in the vapor chamber 36 of the present embodiment, for example, the plate thickness of the first metal plate 50 is set such that a part having the through-holes 58, 59 and forming the sealed space 52 has a plate thickness of around 0.5 mm, and a part forming the sealing portion 36c has a plate thickness of around 0.42 mm. Further, the plate thickness of the second metal plate 51 is around 0.28 mm. In the meantime, the plate thicknesses of the metal blocks 56, 57 are set such that the base portions 56a, 57a have a plate thickness of around 0.5 mm, the flange portion 56b has a plate thickness of around 1.8 mm, and the flange portion 57b has a plate thickness of around 0.2 mm. Note that it goes without saying that these values of the plate thicknesses are just examples and can be changed appropriately depending on the purpose of the vapor chamber 36, mounted devices, and so on.

Note that such a difference in plate thickness between the flange portions 56b, 57b is caused due to the difference between projection heights of the CPU 30 and the GPU 31 from the mounting surface 24a of the mother board 24. That is, the plate thickness of the flange portion 56b of the first metal block 56 connected to the CPU 30 having a low projection height is set to be thicker by the above difference than the plate thickness of the flange portion 57b of the second metal block 57 connected to the GPU 31 having a high projection height. Hereby, in a state where the vapor chamber 36 is placed generally in parallel with the mother board 24, the metal blocks 56, 57 make close contact with the CPU 30 and the GPU 31. This consequently restrains the vapor chamber 36 from causing a gap between the metal blocks 56, 57 and the CPU 30 and the GPU 31 or restrains the vapor chamber 36 from being inclined.

As apparent from FIG. 2, the outer shapes (surface areas) of the metal blocks 56, 57 in a plan view are considerably smaller than the outer shape of the vapor chamber 36. Accordingly, the plate thickness of the first metal plate 50 is not so different from those of the metal blocks 56, 57, but the outer surfaces 56f, 57f can be easily processed into a flat surface with a flatness higher than that of the outer surface 50a.

Referring now to FIGS. 4A to 4D, next will be described a procedure of a manufacturing method of the vapor chamber 36. As described above, the metal blocks 56, 57 have basically the same basic configuration or similar configurations except that the metal blocks 56, 57 have slightly different shapes or sizes. In view of this, in the following description, as illustrated in FIGS. 4A to 4D, the vapor chamber 36 will be described with reference to a configuration only provided with the first metal block 56, and descriptions on the second metal block 57 and an attachment method thereof will be omitted.

Figure 4A:
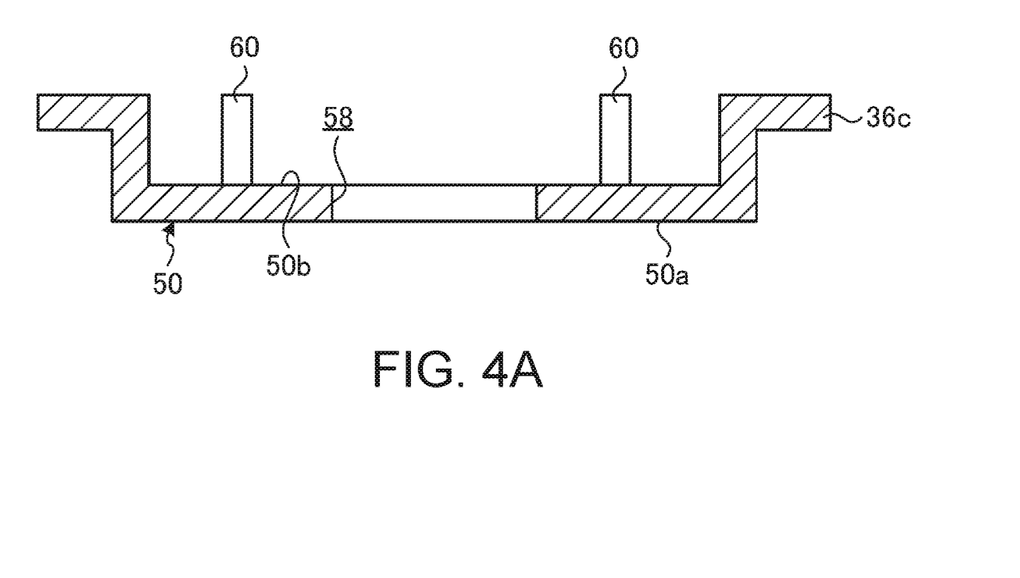
FIG. 4A is a schematic side sectional view illustrating a state where a through-hole is formed in a first metal plate.

First, as illustrated in FIG. 4A, the through-hole 58 is formed in the first metal plate 50. The through-hole 58 may be formed by pressing or the like at the time of forming the first metal plate 50 or may be formed by drilling or the like after the first metal plate 50 is formed.

Figure 4B:
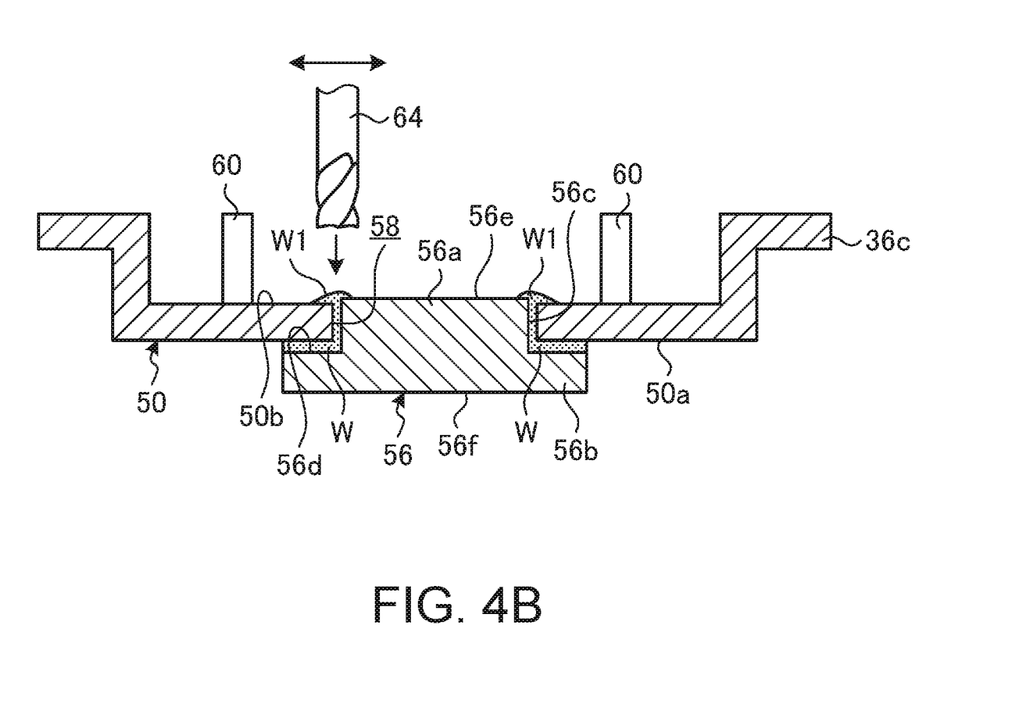
FIG. 4B is a side sectional view illustrating a state where a metal block is attached to the first metal plate illustrated in FIG. 4A.

Then, as illustrated in FIG. 4B, the first metal block 56 is fixed to the first metal plate 50. The base portion 56a of the first metal block 56 is inserted into the through-hole 58 from the outer surface 50a side such that the outer surface 50a is brought into contact with the flange portion 56b. Then, the outer peripheral surface 56c of the base portion 56a is welded to the inner peripheral surface of the through-hole 58, and the surface 56d of the flange portion 56b is welded to the outer surface 50a. Hereby, the first metal block 56 is integrally fixed to the first metal plate 50 in a state where the through-hole 58 is sealed.

In the meantime, as illustrated in FIG. 4B, only by inserting the base portion 56a into the through-hole 58 and joining the base portion 56a to the through-hole 58 via the welded portion W, an end surface of the base portion 56a and a redundant portion W1 of the welded portion W may project on the inner surface 50b side of the first metal plate 50 to form a step. When such a step is formed and remains in the sealed space 52, the ratio of contact of the wick 54 decreases, and smooth flowing of the liquid-phase working fluid flowing through the wick 54 is inhibited.

Figure 4C:
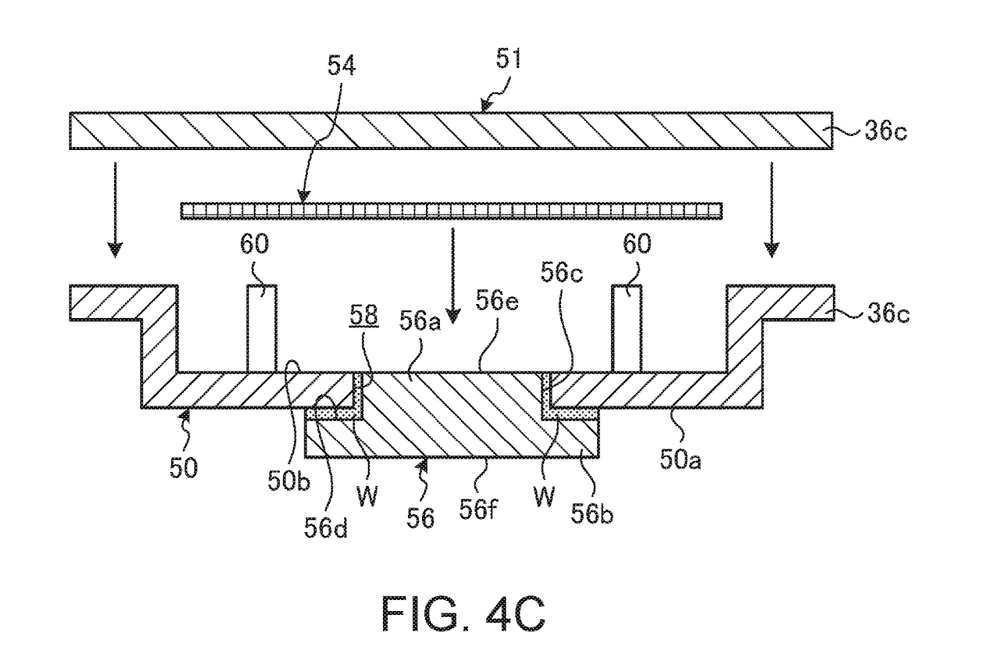
FIG. 4C is a side sectional view illustrating an operation to attach a wick and a second metal plate to the first metal plate illustrated in FIG. 4B.

In view of this, as illustrated in FIGS. 4B and 4C, in order to deal with the occurrence of the step exposed in the sealed space 52, the end surface of the base portion 56a and the redundant portion W1, projecting on the inner surface 50b side, are cut with a cutting edge 64 such as a CNC machine tool. Hereby, a flat inner surface 56e formed to be flush with the inner surface 50b of the first metal plate 50 is formed on the metal block 56.

Figure 4D:
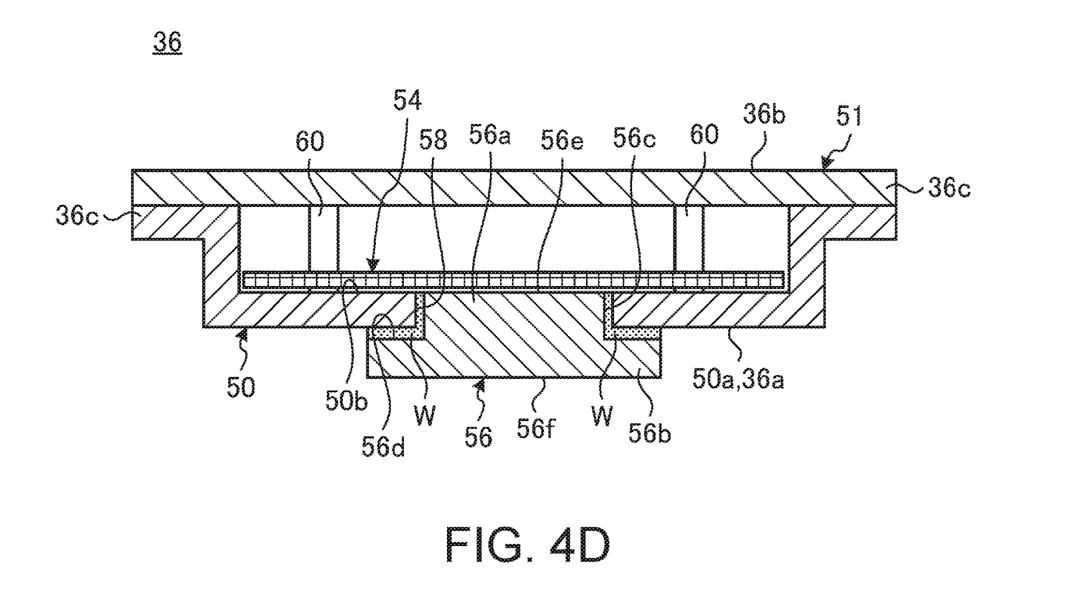
FIG. 4D is a side sectional view of a vapor chamber manufactured such that the wick and the second metal plate are attached to the first metal plate illustrated in FIG. 4C.

Subsequently, as illustrated in FIGS. 4C and 4D, the wick 54 is put on the inner surface 50b of the first metal plate 50, and after that, the second metal plate 51 is joined to the first metal plate 50 to form the sealing portion 36c. At this time, the wick 54 makes contact with the inner surface 56e at a position overlapping with the metal block 56.

Hereby, the sealed space 52 in which the wick 54 is stored is formed between the metal plates 50, 51, and thus, the manufacture of the vapor chamber 36 in which the outer surface 56f of the first metal block 56 is exposed on the bottom surface 36a is completed. As illustrated in FIGS. 2 and 3, in a case where the vapor chamber 36 includes the metal blocks 56, 57, an attachment step of attaching the second metal block 57 should be executed at the same time as or before or after the attachment step of attaching the first metal block 56 as described above.

As described above, in the vapor chamber 36 of the present embodiment, the through-holes 58, 59 communicating with the sealed space 52 are formed in the first metal plate 50 forming the sealed space 52 with the second metal plates 51. Further, the vapor chamber 36 includes the metal blocks 56, 57 inserted into the through-holes 58, 59 and joined to the first metal plate 50 to seal the through-holes 58, 59, the metal blocks 56, 57 having the outer surfaces 56f, 57f formed flat, the outer surfaces 56f, 57f being on a side opposite to a side facing the sealed space 52.

Accordingly, the vapor chamber 36 includes only one heat transmission portion via a TIM 62 provided between the vapor chamber 36 and each of the CPU 30 and the GPU 31 as cooling targets. An arrow indicated by a dotted line in FIG. 3 schematically illustrates a heat flow. For example, heat generated from the CPU 30 is first transmitted from the top surface of the CPU 30 to the outer surface 56f of the first metal block 56 via the TIM 62. The heat thus transmitted to the outer surface 56f is efficiently conducted inside the first metal block 56 having a high thermal conductivity, and after that, the heat is transmitted from the inner surface 56e to the working fluid efficiently and is diffused quickly. Note that heat transfer between the GPU 31 and the vapor chamber 36 is also similar to above.

Hereby, in comparison with a conventional configuration in which the vapor chamber 36 is connected to the CPU 30 or the like by use of a heat receiving plate, the heat transmission portion using a TIM is reduced to half in the vapor chamber 36 of the present embodiment, so that thermal resistance between the CPU 30 or the like and the vapor chamber is largely reduced. Accordingly, the vapor chamber 36 can efficiently absorb heat generated from the CPU 30 and the GPU 31, and thus, the cooling efficiency on the CPU 30 and the GPU 31 improves. As a result, the cooling performance of the cooling module 22 including the vapor chamber 36 also improves, so that the performance of the electronic apparatus 10 also improves.

As illustrated in FIG. 3, the metal blocks 56, 57 include the flange portions 56b, 57b provided integrally with the base portions 56a, 57a sealing the through-holes 58, 59. Hereby, the joining strengths of the metal blocks 56, 57 to the first metal plate 50 improve. Further, the flange portions 56b, 57b facilitate the positioning of the metal blocks 56, 57 to the first metal plate 50 at the time of manufacture, and therefore, the manufacture efficiency improves.

As illustrated in FIG. 3, in the vapor chamber 36, the wick 54 is put on the inner surface 50b of the first metal plate 50 to which the metal blocks 56, 57 are joined, and the wick 54 makes contact with the metal blocks 56, 57. Accordingly, the vapor chamber 36 can absorb the heat of the CPU 30 and the GPU 31 directly from the metal blocks 56, 57 by the working fluid condensed into the liquid phase from the gas phase by heat dissipation. As a result, the heat transfer efficiency from the metal blocks 56, 57 to the working fluid improves, and the cooling performance of the vapor chamber 36 for the CPU 30 or the like further improves.

As illustrated in FIGS. 2 and 3, in the vapor chamber 36, the supports 60 are placed at positions avoiding the metal blocks 56, 57 inside the sealed space 52. Accordingly, the inner surfaces 56e, 57e of the metal blocks 56, 57 are not blocked by the supports 60, so that the metal blocks 56, 57 make contact with the wick 54 with a maximum area. As a result, the heat transfer efficiency from the metal blocks 56, 57 to the working fluid further improves in the vapor chamber 36.

Note that the above description deals with a configuration in which a generally L-shaped bent portion to form the sealing portion 36c and the sealed space 52 is provided in the first metal plate 50 provided with the metal blocks 56, 57, but the bent portion may be provided in the second metal plate 51.

Figure 5:
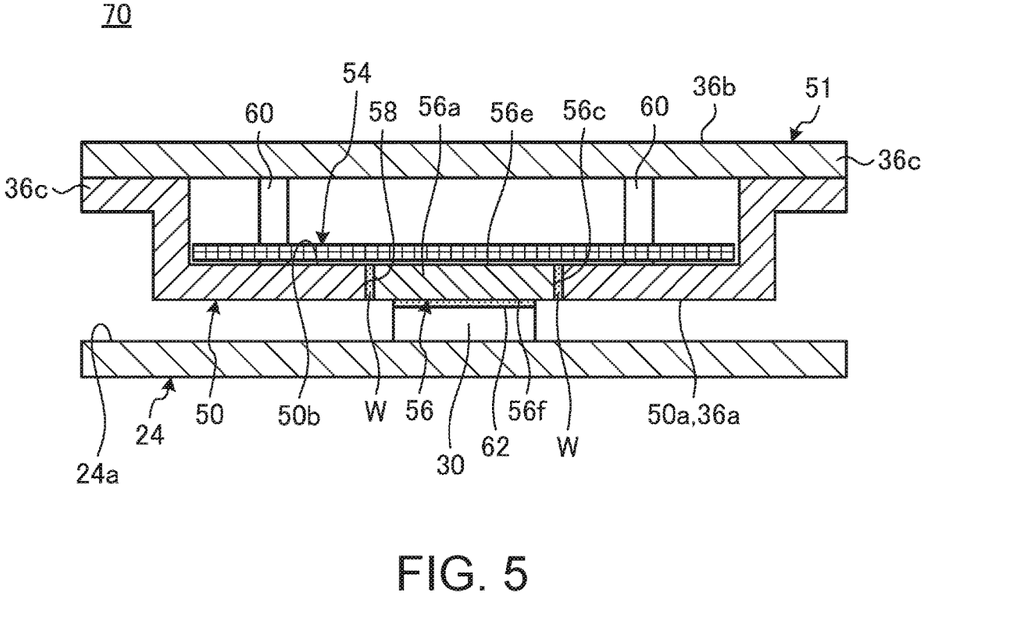
FIG. 5 is a schematic side sectional view of a vapor chamber according to a first modification.

FIG. 5 is a schematic side sectional view of a vapor chamber 70 according to a first modification. In FIG. 5, the same reference sign as a reference sign illustrated in FIGS. 1 to 4D indicates the same or similar configuration in FIGS. 1 to 4D and has the same or similar function and effect in FIGS. 1 to 4D, and therefore, detailed descriptions on the configuration is omitted. This also applies to FIGS. 6 to 7B. Note that, in exemplary configurations illustrated in FIGS. 5 to 7B, only the first metal block 56 is representatively illustrated, but it is needless to say that, even in the exemplary configurations, two metal blocks 56, 57 may be provided similarly to the exemplary configuration illustrated in FIG. 3.

The vapor chamber 70 illustrated in FIG. 5 is different from the vapor chamber 36 in FIG. 3 in that the first metal block 56 does not include the flange portion 56b. That is, in a case where it is not necessary to improve the joining strength to the first metal plate 50 by the flange portions 56b, 57b, the flange portions 56b, 57b can be omitted from the metal blocks 56, 57.

Figure 6:
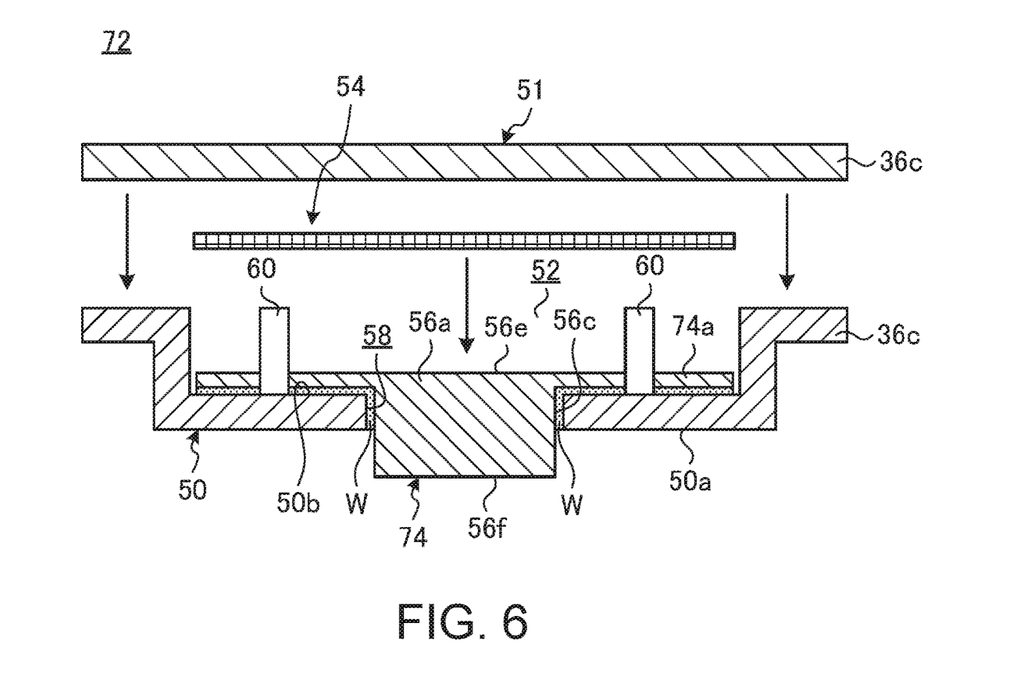
FIG. 6 is a schematic side sectional view illustrating a second metal plate and a wick of a vapor chamber according to a second modification in a disassembled state.

FIG. 6 is a schematic side sectional view illustrating the second metal plate 51 and the wick 54 of a vapor chamber 72 according to a second modification are disassembled.

As illustrated in FIGS. 4B and 4C, generally, the aforementioned vapor chamber 36 requires a cutting step by the cutting edge 64 of a machine tool at the time of manufacturing the vapor chamber 36. Meanwhile, the vapor chamber 72 illustrated in FIG. 6 has a configuration that can omit this cutting step.

As illustrated in FIG. 6, the vapor chamber 72 includes a metal block 74 different from the configuration of the metal blocks 56, 57. Instead of the flange portion 56b, the metal block 74 includes a flange portion 74a provided closer to the sealed space 52 side of the base portion 56a. The top and bottom surfaces of the flange portion 74a are formed flat, and the flange portion 74a is put on the inner surface 50b of the first metal plate 50. The wick 54 is provided on the surface of the flange portion 74a.

Accordingly, the inner surface 50b of the first metal plate 50 is covered with the flange portion 74a thus formed flat, and thereby, the redundant portion W1 is hard to occur in the vapor chamber 72 at the time when the welded portion W is joined, and the end surface of the base portion 56a does not project inside the sealed space 52. As a result, with the vapor chamber 72, it is possible to omit the aforementioned cutting step and to reduce a manufacturing cost. However, in the vapor chamber 72, the flange portion 74a is placed inside the sealed space 52. Accordingly, the plate thickness of the whole vapor chamber 72 tends to be thicker than the vapor chamber 36 illustrated in FIG. 3, and reversely, the vapor chamber 36 has such an advantage that the plate thickness of the whole vapor chamber 36 can be made thin.

Figure 7A:
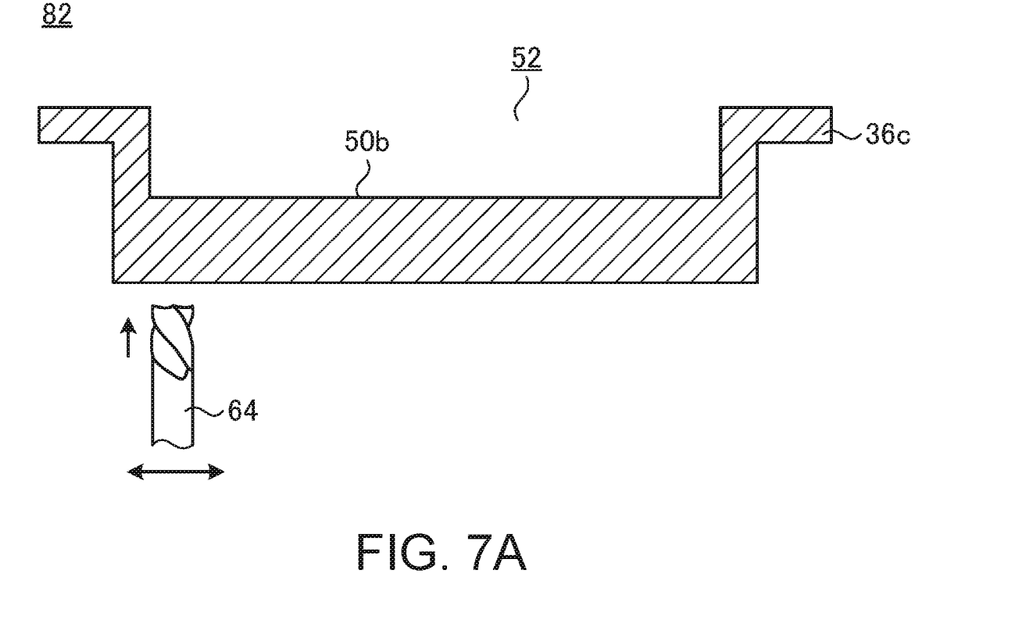
FIG. 7A is a side sectional view schematically illustrating a state before cutting is performed on a first metal plate of a vapor chamber according to a reference example.
Figure 7B:
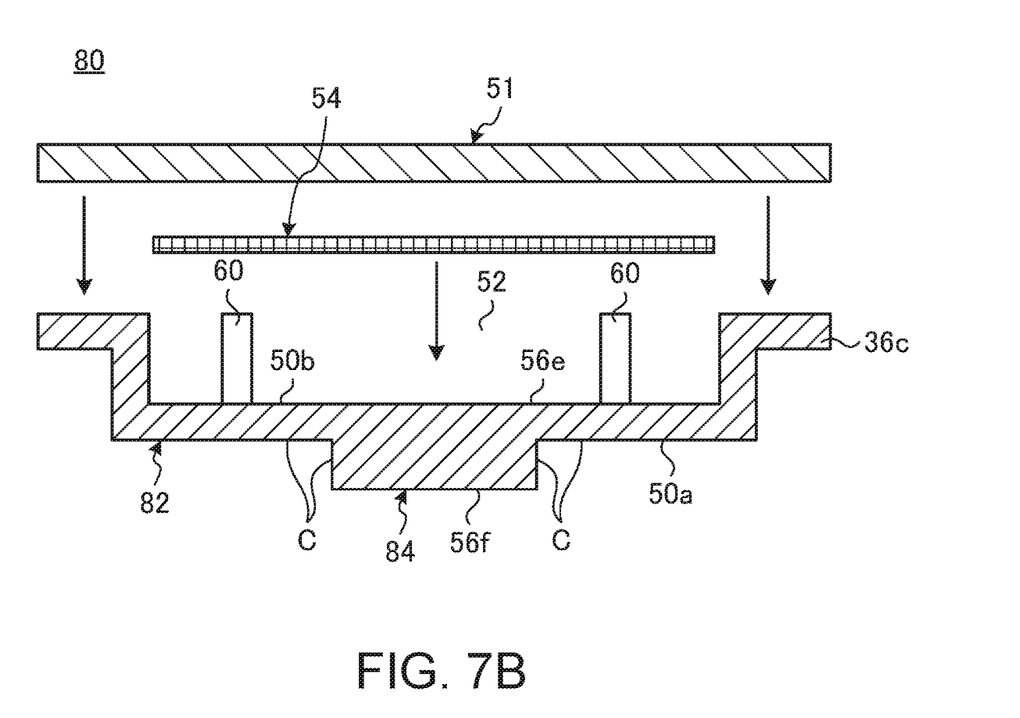
FIG. 7B is a side sectional view illustrating a state where cutting is performed on the first metal plate illustrated in FIG. 7A.

FIG. 7A is a side sectional view schematically illustrating a state before cutting is performed on a first metal plate 82 of a vapor chamber 80 according to a reference example. FIG. 7B is a side sectional view illustrating a state where cutting is performed on the first metal plate 82 illustrated in FIG. 7A and illustrates the second metal plates 51 and the wick 54 in a disassembled state.

As illustrated in FIGS. 7A and 7B, the vapor chamber 80 according to the reference example is configured such that the first metal block 56 is formed by performing cutting on the first metal plate 82. As illustrated in FIG. 7A, in the first metal plate 82, in a state before the cutting, the plate thickness of a part, of the first metal plate 82, that forms the sealed space 52 has a thickness equivalent to the plate thicknesses of the first metal block 56 or the second metal block 57 illustrated in FIG. 3. Such a first metal plate 82 is configured such that its outer surface is cut with the cutting edge 64 such as a CNC machine tool to form a metal block 84 in part of the first metal plate 82 instead of the metal blocks 56, 57. A reference number C in FIG. 7B indicates a cutting surface cut by the cutting edge 64.

Such a vapor chamber 80 has an advantage that the forming step of forming the through-holes 58, 59 and the cutting step of cutting the redundant portion W1 or the like as illustrated in FIGS. 4A to 4C are unnecessary. However, in the vapor chamber it is necessary to perform cutting on a most part of the first metal plate 82 in which each side is equal to or more than cm, for example. Because of this, the manufacturing cost is markedly higher than that of the vapor chamber 36 or the like in FIG. 3, and further, the vapor chamber 80 requires a longer machining time, so that its mass productivity is low. That is, it may be said that the vapor chamber 36 or the like described above is suitable for a mass production because the vapor chamber 36 or the like can be manufactured with a relatively short manufacturing time and a relatively small manufacturing cost.

Note that it is needless to say that the present invention is not limited to the above embodiment and is freely modifiable without departing from the gist of the present invention.

The pair of right and left fans 43, 42 and the pair of right and left heat sinks 41, 40 may not be provided, and only one of the fans 43, 42 and one of the heat sinks 41, 40 may be provided, and the heat conducting plate 44 may be omitted. Further, the vapor chamber 36 and so on can be mounted on an electronic apparatus as a single cooling unit instead of a module structure combined with the fan 42 and the heat pipe 38.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

DESCRIPTION OF SYMBOLS

- 10 electronic apparatus
- 14 chassis
- 22 cooling module
- 24 mother board
- 30 CPU
- 31 GPU
- 36, 70, 72, 80 vapor chamber
- 82 first metal plate
- 51 second metal plate
- 52 sealed space
- 54 wick
- 56 first metal block
- 57 second metal block
- 58, 59 through-hole
- 60 support
- 74, 84 metal block

The invention claimed is:

1. A vapor chamber comprising:
a first metal plate;
a second metal plate having an outer edge portion joined to the first metal plate and forming a sealed space in which working fluid is enclosed, the sealed space being formed between the first metal plate and the second metal plate;
a plurality of supporting columns rising between the first metal plate and the second metal plate inside the sealed space, and
a wick stored inside the sealed space,
wherein
the first metal plate has a through-hole communicating with the sealed space;
the vapor chamber further includes a metal block inserted into the through-hole and joined to the first metal plate to seal the through-hole, the metal block having an outer surface formed flat on a side opposite to a side facing the sealed space, and
the supporting columns are placed at positions surrounding the through-hole.

2. The vapor chamber according to claim 1, wherein the metal block includes:
a base portion embedded in the through-hole, and
a flange portion having an outer shape larger than the base portion, the flange portion being joined to an outer surface of the first metal plate.

3. The vapor chamber according to claim 1,
wherein the metal block includes:
a base portion embedded in the through-hole, and
a flange portion having an outer shape larger than the base portion, the flange portion being joined to an inner surface of the first metal plate inside the sealed space.

4. The vapor chamber according to claim 1, wherein
the wick is put on an inner surface of the first metal plate inside the sealed space and makes contact with the metal block.

5. An electronic apparatus comprising:
a chassis;
a heat generator provided inside the chassis; and
a vapor chamber provided inside the chassis and configured to absorb heat generated from the heat generator,
wherein the vapor chamber includes:
a first metal plate having a through-hole,
a second metal plate having an outer edge portion joined to the first metal plate and forming a sealed space in which working fluid is enclosed, the sealed space being formed between the first metal plate and the second metal plate,
a plurality of supporting columns rising between the first metal plate and the second metal plate inside the sealed space,
a wick stored inside the sealed space, and
a metal block inserted into the through-hole and joined to the first metal plate to seal the through-hole, the metal block having an outer surface formed flat on a side opposite to a side facing the sealed space;
wherein
the supporting columns are placed at positions surrounding the through-hole, and
the outer surface of the metal block is connected to the heat generator.

6. The electronic apparatus according to claim 5, further comprising:
a substrate on which the heat generator is mounted, the substrate being placed generally in parallel with the vapor chamber,
wherein
the heat generator includes:
a first heat generator, and
a second heat generator having a projection height from the substrate, the projection height being larger than a projection height of the first heat generator from the substrate;
the through-hole includes:
a first through-hole, and
a second through-hole formed at a position different from the first through-hole in the first metal plate; and
the metal block includes:
a first metal block inserted into the first through-hole and having an outer surface connected to the first heat generator, and
a second metal block inserted into the second through-hole and having a plate thickness thinner than a plate thickness of the first metal block by a difference between the projection height of the first heat generator and the projection height of the second heat generator, the second metal block having an outer surface connected to the second heat generator.

* * * * *